US012775776B1

(12) United States Patent
Valat et al.

(10) Patent No.: US 12,775,776 B1
(45) Date of Patent: Oct. 27, 2026

(54) ENABLING CUSTOMIZING REPORTS WITH LIVE PREVIEW ON ONE SCREEN

(71) Applicant: Morgan Stanley Services Group Inc., New York, NY (US)

(72) Inventors: Jithin Valat, Bengaluru (IN); Kartik D. Pai, Bengaluru (IN)

(73) Assignee: Morgan Stanley Services Group Inc., New York, NY (US)

(*) Notice: Subject to any disclaimer, the term of this patent is extended or adjusted under 35 U.S.C. 154(b) by 0 days.

(21) Appl. No.: 19/281,295

(22) Filed: Jul. 25, 2025

(51) Int. Cl.

| | |
|---|---|
| ***G06F 3/048*** | (2013.01) |
| ***G06F 3/0481*** | (2022.01) |
| ***G06F 3/0484*** | (2022.01) |
| ***G06F 40/106*** | (2020.01) |
| ***G06F 40/137*** | (2020.01) |
| ***G06F 40/143*** | (2020.01) |
| ***G06F 40/166*** | (2020.01) |

(52) U.S. Cl.
CPC .......... *G06F 40/106* (2020.01); *G06F 3/0481* (2013.01); *G06F 3/0484* (2013.01); *G06F 40/137* (2020.01); *G06F 40/143* (2020.01); *G06F 40/166* (2020.01)

(58) Field of Classification Search
CPC .... G06F 40/106; G06F 40/137; G06F 40/166; G06F 40/143; G06F 3/0481; G06F 3/0484
See application file for complete search history.

(56) References Cited

U.S. PATENT DOCUMENTS

| | | | | |
|---|---|---|---|---|
| 9,055,017 | B2 * | 6/2015 | Agarwal | H04L 51/212 |
| 9,563,613 | B1 | 2/2017 | Dinkel et al. | |
| 11,762,941 | B2 * | 9/2023 | Gulati | G06N 3/044 715/234 |
| 12,045,560 | B2 | 7/2024 | Bradley et al. | |
| 12,277,112 | B2 * | 4/2025 | Mauritz | G06F 16/2428 |
| 12,353,498 | B2 * | 7/2025 | Chandrasekaran | H04L 67/5682 |
| 12,461,911 | B2 * | 11/2025 | Sutrave | G06F 16/2428 |
| 2004/0073708 | A1 | 4/2004 | Warnock | |
| 2005/0132284 | A1 | 6/2005 | Lloyd et al. | |
| 2014/0096046 | A1 * | 4/2014 | Zhong | G06F 3/0481 715/765 |
| 2014/0289289 | A1 | 9/2014 | Fujioka | |
| 2015/0020010 | A1 * | 1/2015 | Hale | G06F 3/04842 715/765 |
| 2017/0139404 | A1 * | 5/2017 | Anand | G05B 19/4155 |
| 2019/0087069 | A1 * | 3/2019 | McCauley | G06F 8/38 |
| 2020/0117172 | A1 * | 4/2020 | Anand | G06F 9/451 |
| 2020/0210816 | A1 * | 7/2020 | Luo | G06F 17/18 |
| 2020/0326916 | A1 | 10/2020 | Sreenivasan et al. | |
| 2023/0186093 | A1 * | 6/2023 | Duong | G06N 3/0455 706/25 |

(Continued)

*Primary Examiner* — David Phantana-angkool
(74) *Attorney, Agent, or Firm* — Duane Morris LLP

(57) ABSTRACT

A system for managing a configurable GUI for customizing and viewing a report is disclosed. The GUI has several panels on one screen for collectively controlling the organization and look-and-feel of the report, presenting a real-time view of the report in response to control changes, and providing a report document with an identical appearance as the real-time view. The panels are separately configurable. The panels also operate independently and communicate by passing information regarding events that occur in respective panels.

19 Claims, 9 Drawing Sheets

(56) References Cited

U.S. PATENT DOCUMENTS

| | | | | |
|---|---|---|---|---|
| 2023/0208449 | A1* | 6/2023 | Luo | H03M 13/6513<br>706/15 |
| 2023/0298219 | A1* | 9/2023 | Galpin | H04N 19/61<br>382/232 |
| 2024/0362207 | A1* | 10/2024 | Sutrave | G06F 16/2428 |
| 2025/0005263 | A1* | 1/2025 | Mansour | G06F 40/166 |

* cited by examiner

```
[
{
"moduleName": "Balance Sheet",
"moduleId": 4001,
"sectionId": 0,
"showCheckbox": false,
"disable Checkbox": false,
"showInMidSection": true,
"showIndeterminateState": false,
"isExpanded": false,                    402
"children": [],
"planType": "PLAN",
"isHovered": false,
"isHide": false
},
{
"moduleName": "Assumptions",
"moduleId": 4002,
"sectionId": 0,
"showCheckbox": true,
"disableCheckbox": false,
"showInMidSection": true,
"showIndeterminateState": false,
"isExpanded": false,                    404
"children": [],
"planType": "PLAN",
"isHovered": false,
"isHide": true
},
{
"moduleName": "Executive Summary",
...                                     406
"children": [
{
"sectionName": "Portfolio Summary",
...                                     408
},
{
"sectionName": "Tax Summary",
...                                     410
}
],
"planType": "PLAN",
"isHovered": false,
"isHide": false
}
]
```

FIG. 4A

| Property | Definition |
| --- | --- |
| sectionName | Holds name of a left panel element (GUI element) |
| SectionId | Holds unique id representing the left panel item |
| showCheckbox 422 | Controls display of checkbox for the left panel item for user selection to finally include as PDF. If false, checkbox is not provided |
| showInMidSection | Holds the status of checkbox associated with left panel item. If showCheckbox is false, then this is true and by default included in the final PDF |
| isHovered | Holds mouseover status to apply few additional styles |
| Disable | Helps to disable the left panel item |
| isHide | Helps to hide the left panel item if not applicable to report |
| Children | Helps to configure sub section within a parent section. Holds all the properties defined above |
| isExpanded | Helps to retain if a parent section is expanded to view subsections |

FIG. 4B

ENABLING CUSTOMIZING REPORTS WITH LIVE PREVIEW ON ONE SCREEN

TECHNICAL FIELD

The present disclosure relates to enabling building and presenting reports using a graphical user interface (GUI), and more particularly to enabling customizing reports with live preview on one screen.

BACKGROUND

Conventionally, providing support for building a digital report involves separate processes, such as a first process for visualizing the report and a second, independent process for generating a report document. For example, the report visualization can be implemented using an operating system's graphical user interface (GUI) framework, while the document generation can be implemented using Portable Document Format (PDF) export. Separate development, testing, and maintenance efforts are required for different processes. In addition, inconsistencies can exist between the visual representation and the report document. Therefore, it would be helpful to have an integrated environment for customizing and visualizing a digital report.

SUMMARY

The appended claims may serve as a summary of the invention.

BRIEF DESCRIPTION OF THE DRAWINGS

Example embodiments will now be described by way of non-limiting examples with reference to the accompanying drawings, in which:

FIG. 4A illustrates an example configuration file for a navigation panel.

FIG. 4B illustrates an example list of definitions for properties of a navigation panel.

DETAILED DESCRIPTION OF CERTAIN EMBODIMENTS

Figure 1:
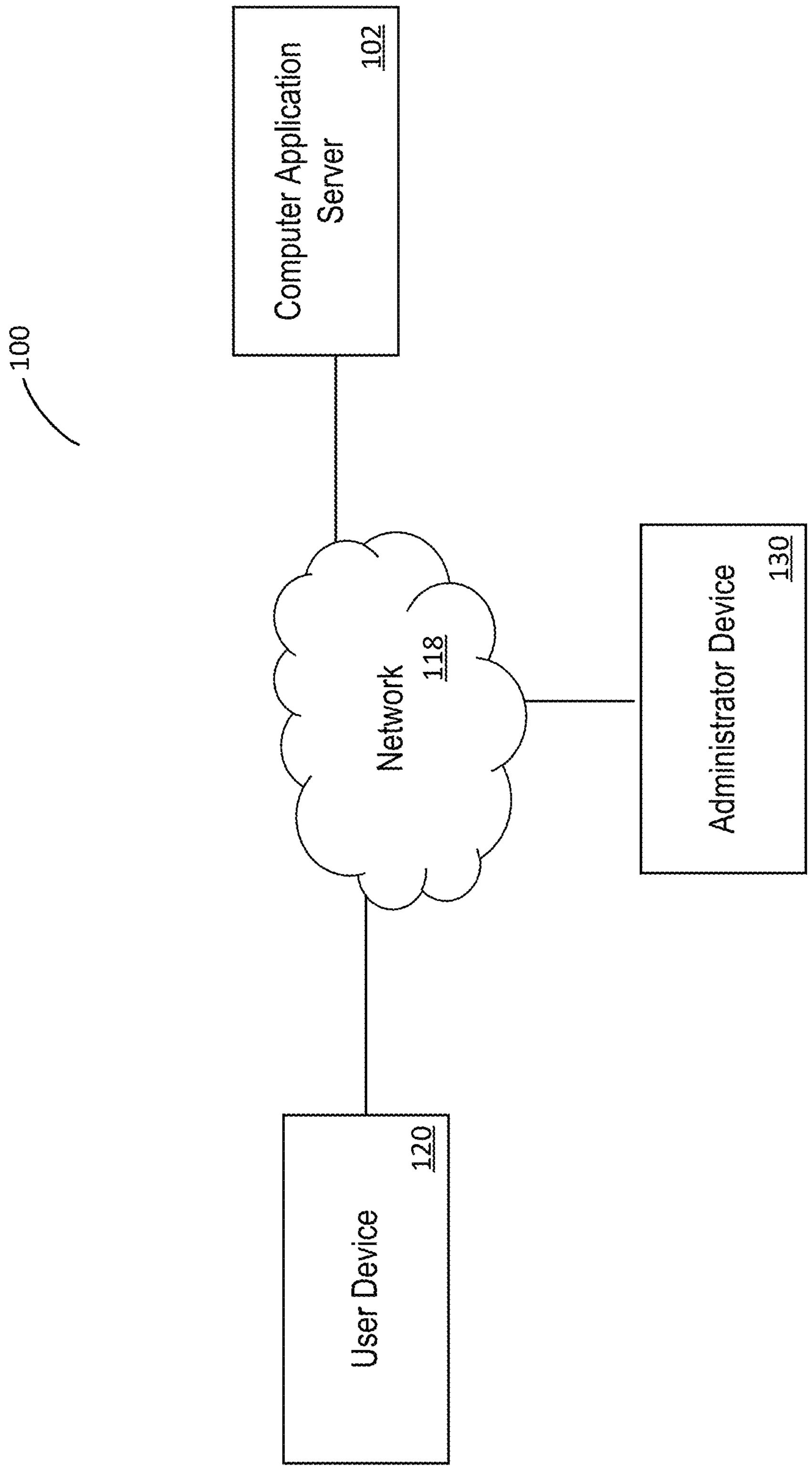
FIG. 1 illustrates an example networked computer system in which various embodiments may be practiced.

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

1. General Overview

A system for managing a configurable GUI for customizing and viewing a report is disclosed. The GUI has several panels on one screen for collectively controlling the organization and look-and-feel of the report, presenting a real-time view of the report in response to control changes, and providing a report document with an identical appearance as the real-time view. The panels are separately configurable. The panels also operate independently and communicate by passing information regarding events that occur in respective panels.

In some embodiments, a server device is programmed to generate or host source code, executables, or related configurations, such as data related to a Web application, in a repository. The service device can be configured to obtain data for a report library that can be incorporated into a consuming Web application as well as data for the consuming Web application from one or more administrator devices or user devices. The service device can be programmed to then generate the consuming Web application that incorporates the report library. The report library is designed to manage a configurable GUI for customizing and viewing a report having different sections of text or images. The report library can control the layout or certain aspects of the GUI while expecting specific content or parameter values at run time from a consuming Web application to further configure the GUI, pass in raw report data, or perform other application management tasks. The server device can also be configured to host a Web server for executing Web applications or the backend thereof.

In some embodiments, a user device can be programmed to host a Web client for executing Web applications or the front end thereof. The user device can be programmed to request executing the consuming Web application based on specific configuration data or report data, which could reside in a local memory or already in the repository. The user device can be programmed to, in response, launch a GUI, such as a webpage, for the consuming application. The GUI has several panels on one screen subject to the configurations. The panels include a navigation panel for organizing and navigating through different sections of a report. For example, the navigation panel can include a set of GUI elements that allow specifying where a section of the report is positioned within the report or whether the is to be included in a generated document. The panels also include a customization panel for determining the appearance of elements of the report. For example, the customization panel can include a set of GUI elements that allow setting the format of a section of the report as a chart or a table or specifying the number of columns in the table. These panels receive user inputs and communicate information regarding such events to effect corresponding changes to the report. The panels additionally include a display panel that shows a live preview of the report as a result of those events. In general, each user input can lead to an immediate refresh of the live preview. The GUI also includes an option that allows the generation of a report document that is visually identically to the current view of the report.

The system disclosed herein including the server device and the user device has several technical benefits. By allowing the customization, preview, and document generation of a report within one screen and in real time, the system enables an efficient end-to-end process for building and producing complex, structured report, that ensures consistency of the report view in different contexts. By managing a rich set of configurations that cover various aspects from the function and appearance of the control elements to those of the report elements, the system affords high flexibility in report generation often governed by diverse requirements, further increasing the efficiency of the report generation process. By utilizing a plug-and-play architecture where a report library can be incorporated into any consuming application, the system allows the key features of report generation to be easily adoptable and integrable into bigger environments with various application management that enrich the report generation process.

2. Example Computing Environments

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, a networked computer system 100 comprises a computer application server ("server") 102 and a user device 120, which are communicatively coupled through direct physical connections or via a network 118.

In some embodiments, the server 102 is programmed or configured to manage a Web server in a distributed environment. The server 102 can also be programmed to manage a repository of source code, programs, or metadata, including data for a report library for customizing and viewing a report and data for one or more consuming Web applications. The server 102 can be programmed to execute the backend of a consuming Web application incorporating the report library via the Web server. The server 102 can comprise any centralized or distributed computing facility with sufficient computing power in data processing, data storage, and network communication for performing the above-mentioned functions.

In some embodiments, the administrator device 130 is programmed to configured to manage various applications, such as Web applications and libraries, including the generation of the report library or a consuming Web application. The management can include transmitting source code, executables, or related configurations to the server 102. The administrator device 130 can comprise any personal computing device, such as a desktop computer, laptop computer, or tablet computer. In other embodiments, some of the functions performed by the administrator device 130 can be performed by the server 102.

In some embodiments, the user device 120 is programmed or configured to manage a Web client in the distributed environment. The user device 120 is further programmed to request execution of the consuming Web application based on specific report data or configuration data and in turn execute the front end of the consuming Web application incorporating the report library via a Web client. The user device 120 can comprise any personal computing device, such as a desktop computer, laptop computer, or tablet computer. In other embodiments, some of the functions performed by the user device 120 can be performed by the administrator device 130, and vice versa.

The network 118 may be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), or the Internet, a terrestrial or satellite link.

In some embodiments, the user device 120 is programmed to submit a Web request for running the consuming Web application to the server 102. The user device 120 is programmed to, in return, present a GUI via a Web browser based on the report library and an associated set of configurations. The user device 120 is further programmed to receive user input for customizing or visualizing a report, update the GUI based on the user input, and/or communicate with the server 102 to update the GUI or store updates to the report or associated metadata. The user device 120 can be programmed to also receive user input for generating a report document and generate the report document that is synchronized with the visualization.

3. Functional Descriptions 3.1. Application Framework

In some embodiments, a device is programmed to generate a Web application, such as a single-page application (SPA), or a reusable package. An example is an ANGULAR application or an ANGULAR library. A reusable package for report management (a "report library" hereinafter) can be built from a Hypertext Markup Language (HTML) file that defines the layout of a report view and default configuration files, such as TypeScript files, for configuring one or more portions of the report view. The report library can be integrated into a consuming Web application. In general, the server 102 is programmed to generate or store a report library or a consuming Web application into which the report library is integrated. The server 102 is further programmed to receive relevant configuration files and execute the backend of the consuming Web application incorporating the report library via a Web server. The user device 120 is programmed to execute the front end of the consuming Web application incorporating the report library via Web client, such as a Web browser. Depending on how the consuming Web application is implemented, there are various ways in which the report library can be integrated into the consuming Web application and how different portions of the report view could be managed between the consuming Web application and the report library, as further discussed below.

In some embodiments, the report library allows the consuming Web application to inject entire portions or panels of a report review. This can be done via content projection in the ANGULAR environment that can handle dynamic content, for example. The injection can cover just the GUI elements of the panel or additional logic associated with the GUI elements, including retrieving corresponding section data. Instead of or in addition to content projection, the consuming Web application can also pass specific data to the report library via an input interface of the report library.

In some embodiments, the consuming Web application can have its own configurations in one or more configuration files for a custom report. Instead of having the HTML file embedded in the report library, the consuming Web application can also have its own definition of the layout of the report view. In addition, the consuming Web application can have access to data sources, such as an endpoint of the Representational State Transfer (REST) application programming interface (API), a local JavaScript Object Notation (JSON) file, or an in-memory data array, that includes the original data or metadata for a report view, which can be converted into a report document.

In some embodiments, the consuming Web application can pass global configurations to the report library at the time of importing the report library. For example, in the ANGULAR environment, the forRoot( ) method can be used to allow the consuming Web application to tweak how the report library behaves, such as enabling features, setting default values, or toggling behaviors. Examples of such global configurations can specify whether to hide a presentation option if not required, whether to use an inbuilt theme, or whether to enable a particular panel.

Figure 2:
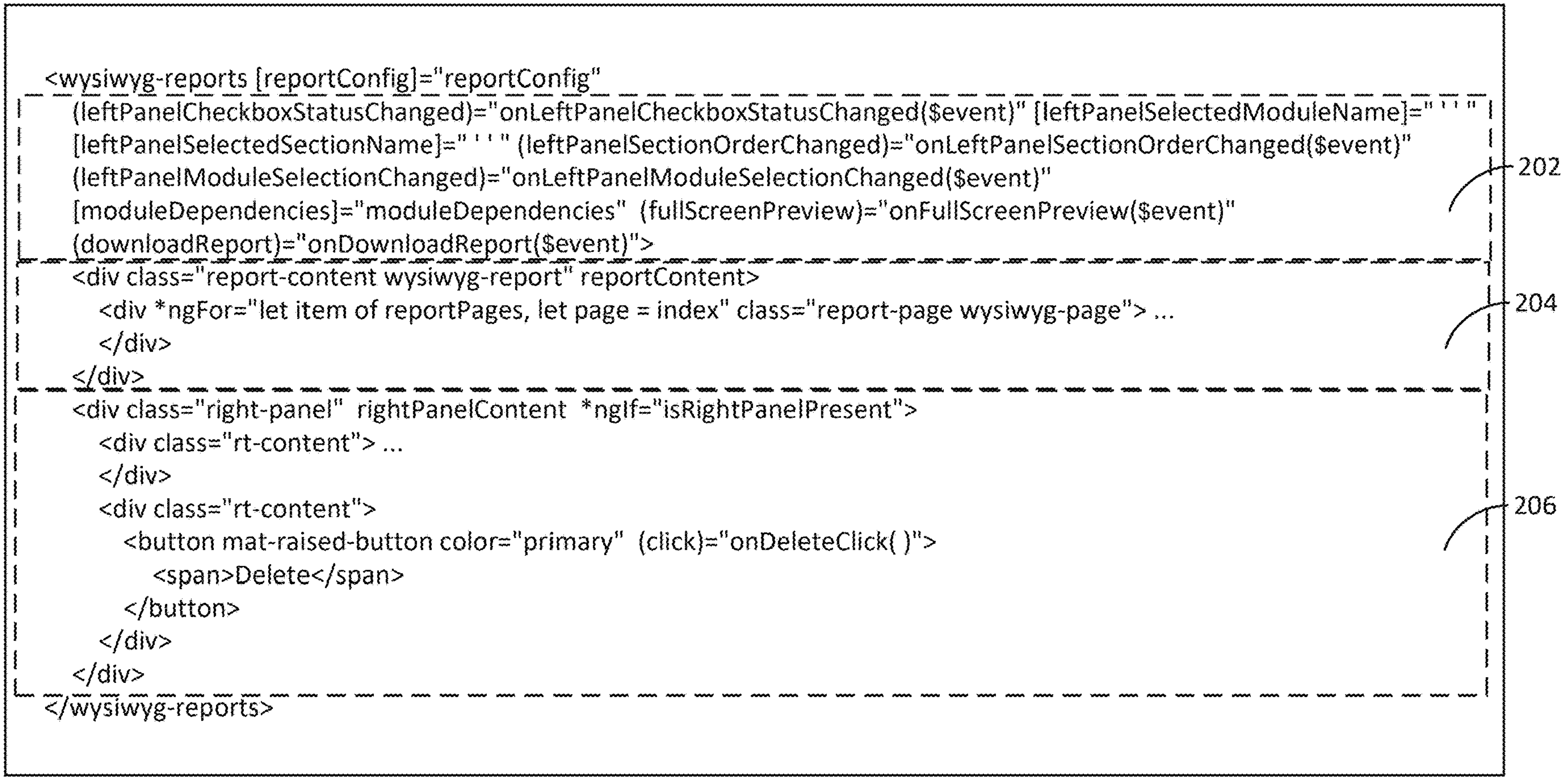
FIG. 2 illustrates an example code snippet for a report view associated with a report library integrated into a consuming Web application.

FIG. 2 illustrates an example code snippet for a report view associated with a report library integrated into a consuming Web application. The code snippet includes code that can receive configurations possibly from the consuming Web application. The portion 202 includes code related to a left panel as a navigation panel in the report view, as further discussed below. The portion 202 allows rendering the left panel and captures events that occur in the left panel. The portion 202 exposes certain events that occur in the left panel to which the consuming Web application can subscribe and respond accordingly, such as utilizing that event information to generate a live preview for the middle panel. The code snippet could also include another portion similar to the portion 202 for a top panel as a view adjustment panel. The portion 204 includes code related to the middle panel as a display panel, as further discussed below. Compared to the portion 202, the portion 204 uses a different approach for setting up the middle panel. The portion 204 allows the middle panel to be directly injected, including the GUI elements or corresponding logic, thus leaving control of the middle panel to the consuming Web application. The portion 206 includes code related to the right panel as a customization panel, as further discussed below. The portion 206 uses the same approach as the portion 204 for setting up the right panel. The portion 206 indicates that the right panel is optional and determines whether the right panel is present. The portion 206 then allows the right panel to be directly injected, including the GUI elements or corresponding logic.

Figure 3A:
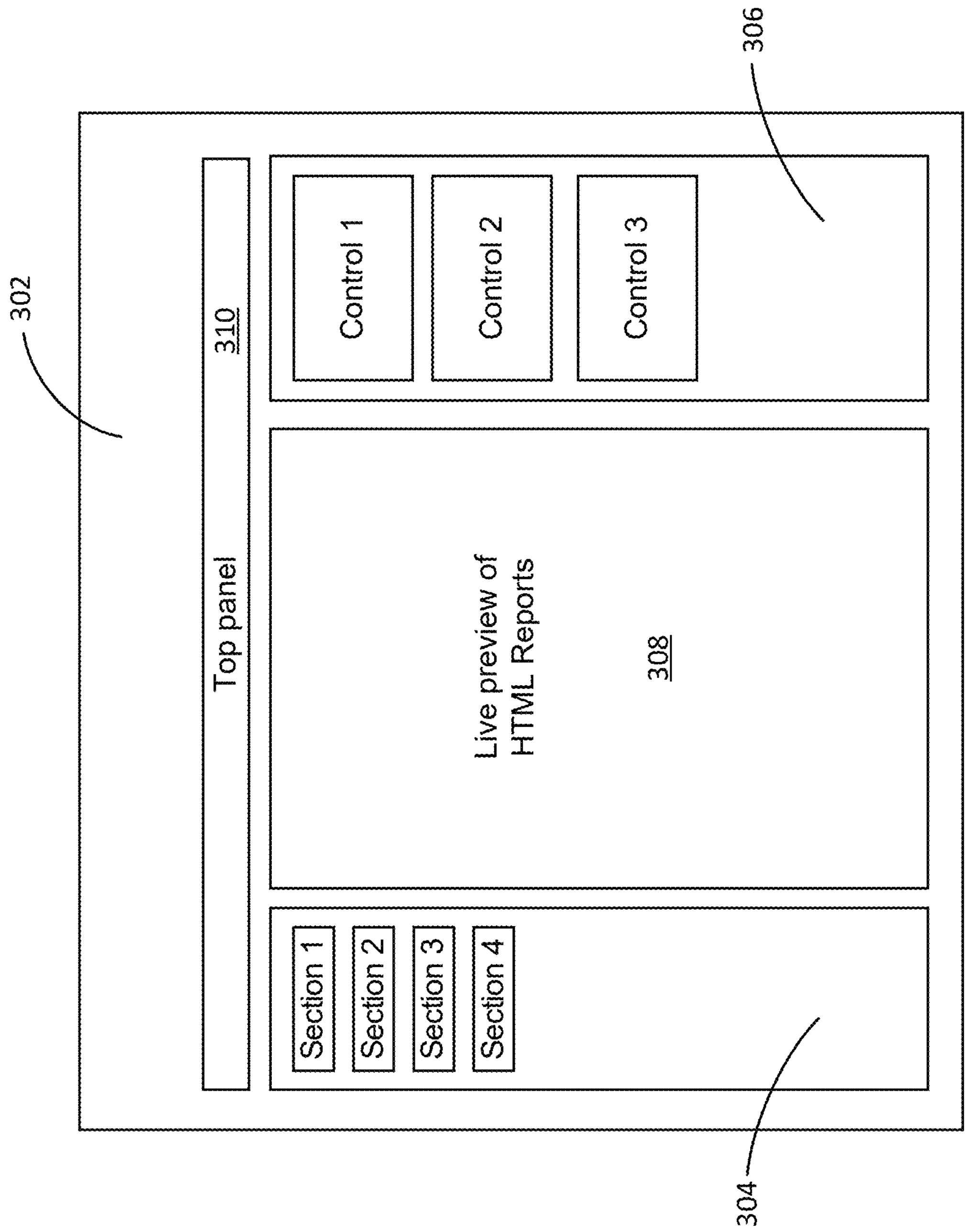
FIG. 3A illustrates an example layout template for a report view of a report being formed.
Figure 3B:
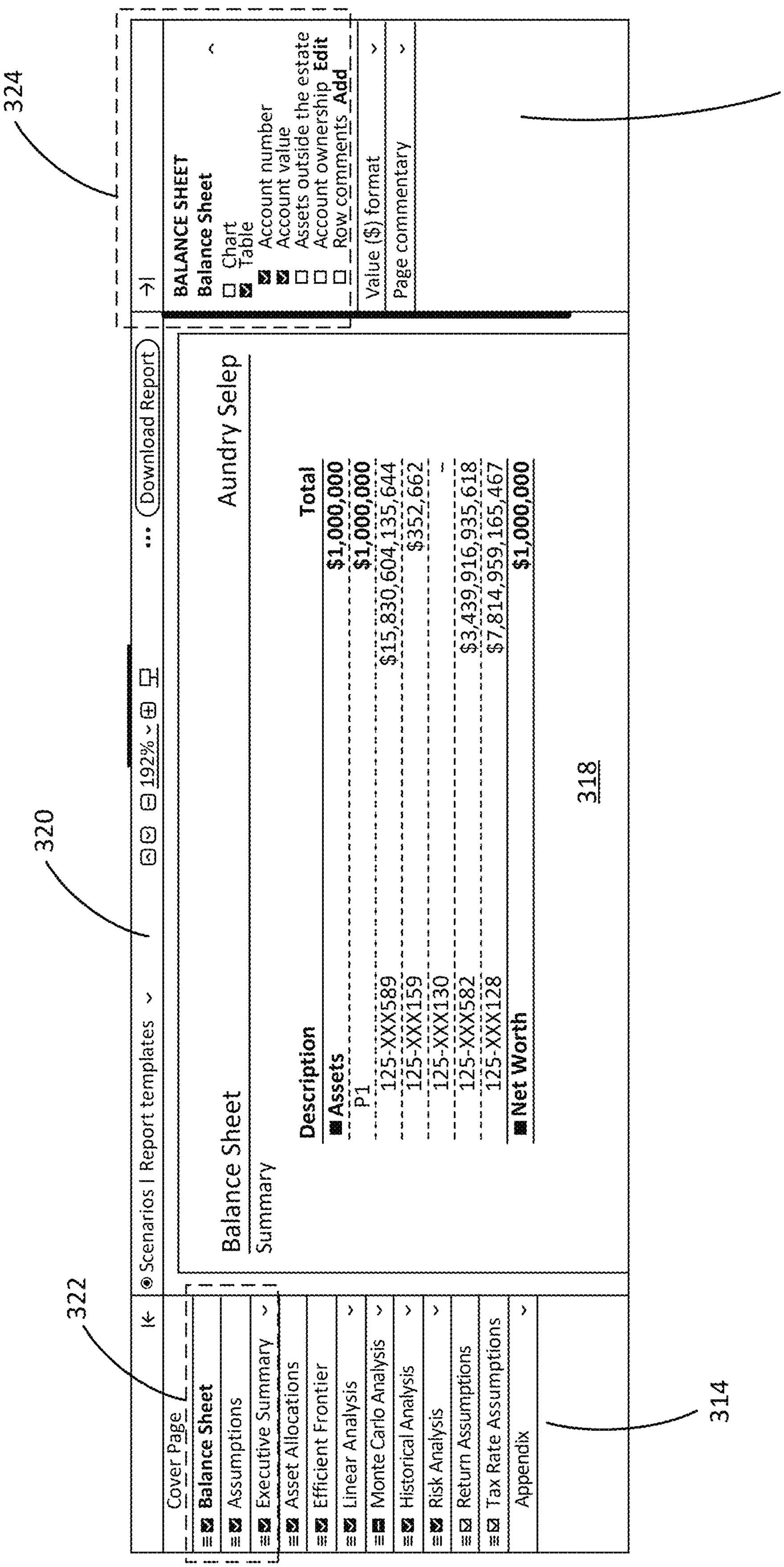
FIG. 3B illustrates an example report view.

FIG. 3A illustrates an example layout template for a report view of a report being formed. The report includes the underlying data being presented in the report view. The layout template 302 has four panels, namely the left panel 304 as a navigation panel, the right panel 306 as a customization panel, the top panel 310 as a view adjustment panel, and the middle panel 308 as a display panel, where all the panels receive user inputs except for the middle panel 308, which shows a live preview of at least a portion of the report in response interactions with the other panels. Each of the left panel 304, the right panel 306, and the top panel 310 is a representative panel with representative functionality. It is to be appreciated that another layout template can have any number of panels arranged in any manner, each panel serving any function illustrated in FIG. 3A or another function. FIG. 3B illustrates an example report view. This report view is based in part on the layout template 302 and includes a left panel 314, a right panel 316, a middle panel 318, and a top panel 320.

In some embodiments, at run time, different panels of a report view operate independently but can communicate with one another via events. Generally, an event is an interaction with a GUI element in a panel as a child component of the panel. Once the event is detected, the data associated with the event would be passed to another panel in real time based on one or more configurations. For example, in an ANGULAR library, the inter-panel communication can be implemented through event binding and data binding such that an event triggers the transfer of data between panels. The passing of event information can be managed within the report library or through the consuming Web application.

3.2. Navigation Panel

In some embodiments, a navigation panel in the report view, such as the left panel 314 in FIG. 3B, enables navigation of the report at run time. The navigation panel includes a graphical representation of a hierarchical structure of the report having various GUI elements, such as the tree of nodes in the left panel 314. For example, the GUI element for a balance sheet section of a report can comprise one or more checkboxes, buttons, links, or clickable labels. A selection of a GUI element corresponds to a selection of the corresponding section of the report and can trigger a real-time preview of the selected section in a display panel of the report view, such as the middle panel 318. The preview can be shown at a particular zoom level, which can be updated via a view adjustment panel. As a result, selecting a GUI element can lead to a preview of the beginning of the corresponding section at the current zoom level. The navigation panel can be browsed like an ordinary webpage and can also allow modification of the hierarchical structure by moving the GUI elements graphically. For example, a GUI element can be dragged and dropped to another location in the graphical representation. Such modification is also communicated to the display panel in real time and can trigger an adjustment of the preview.

In some embodiments, the behavior of the navigation panel is controlled by a group of configurations. FIG. 4A illustrates an example configuration file for a navigation panel. Such a configuration file includes properties of the navigation panel that define the behavior of the navigation panel, including its interaction with a report document generated based on the current preview of (any portion of) the report. In this example, the configuration file corresponds the portion 322 of the left panel 314 in FIG. 3B, which includes three nodes and two additional nodes under an expandable of the three nodes. Each node can be associated with its own set of properties. The three sets of properties 402, 404, and 406 are for the three nodes, while the two sets of properties 408 and 410 are for the two additional nodes. It is to be appreciated that a configuration file can include any number of sets of properties, and each property can define any aspect of the navigation panel.

FIG. 4B illustrates an example list of definitions for properties of a navigation panel. These properties can indicate the identifying information of a GUI element, content of the GUI element, shown or enabled (for interaction) status of the GUI element, or if enabled an interaction status of the GUI element. For example, a value of true for the showCheckbox property 422 means that a checkbox will be shown for a GUI element in the left panel that allows a user to indicate whether a corresponding section of the report should be included in the generated report document. As a result of interacting with the navigation panel, some of the original data may not be included in the report being formed.

In some embodiments, the navigation panel is set up to communicate one or more events. One example event is a GUI element, such as the checkbox or the clickable text associated with the property 422, being selected or unselected. Information representing such an event can include an event type, an identifier of the GUI element or the corresponding section of the report, and the current status of the GUI element. Another example event is a GUI element being moved within the graphical representation. Information representing such an event can include the event type, an identifier of the GUI element or the corresponding section of the report, and the destination of the GUI element. Information regarding the events affects the behavior of the display panel and the customization panel, as further discussed below.

3.3. Customization Panel

In some embodiments, a customization panel in the report view, such as the right panel 316 in FIG. 3B, enables customization of the report at run time. The customization panel includes GUI elements representing settings of a section of the report, such as the section corresponding to the GUI element selected in the navigation panel. A selection of a GUI element in the customization panel can trigger a real-time preview of the section in a display panel of the report view subject to the corresponding setting. The customization panel can be browsed like an ordinary webpage.

Figure 5:
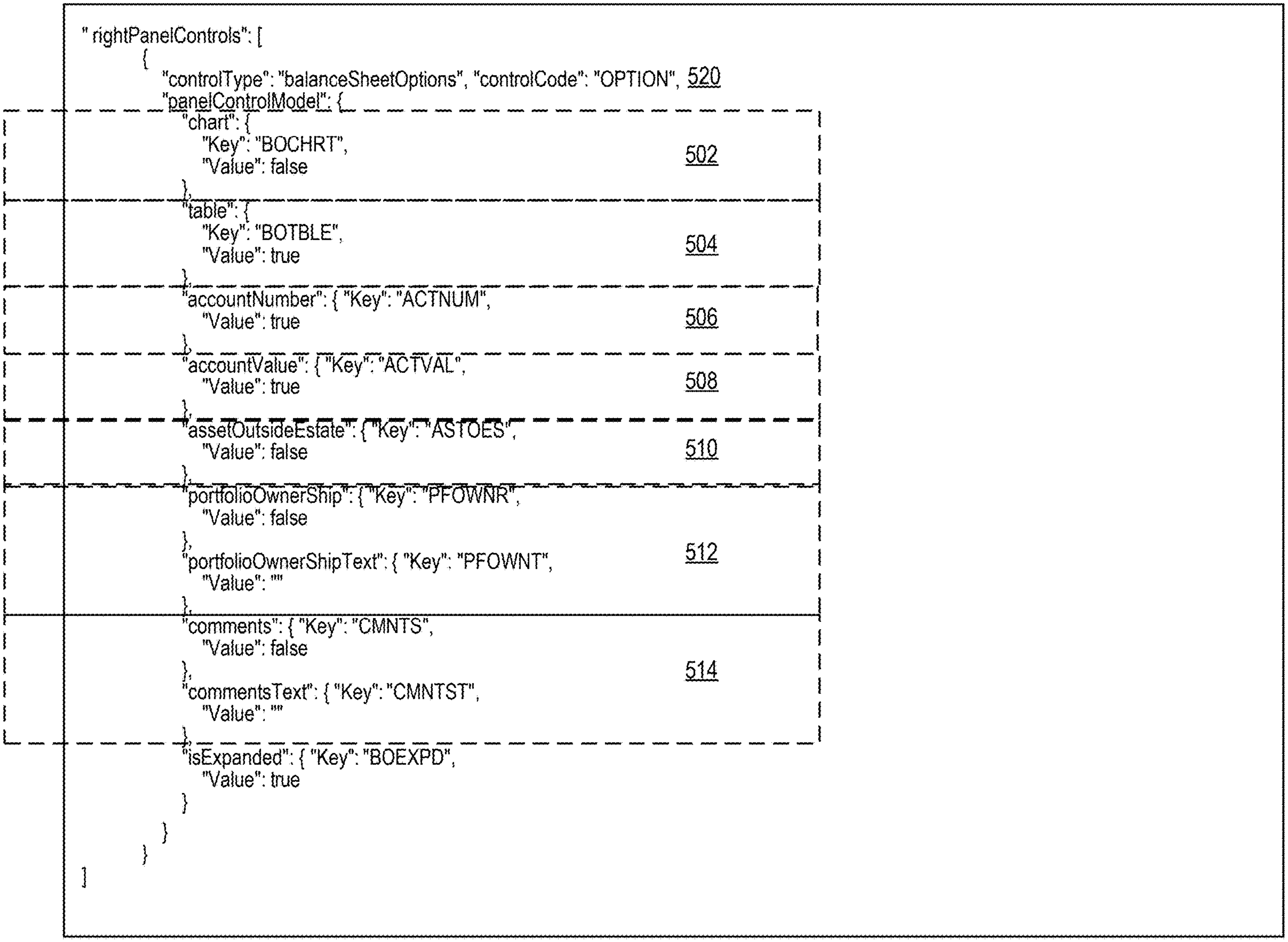
FIG. 5 illustrates an example configuration file for a customization panel.

In some embodiments, the behavior of the customization panel is controlled by a group of configurations. FIG. 5 illustrates an example configuration file for a customization panel. Such a configuration file includes settings represented as various GUI elements in the customization panel for a corresponding section of the report to determine the appearance of the report in the report view and in the report document generated based on the current preview of (any portion of) the report. The appearance can cover how elements of each section is organized and presented in terms of any physical features, such as format, shape, or color. In this example, the configuration file corresponds to the portion 324 of the right panel 316 in FIG. 3B, which includes two attributes and five additional attributes under one expandable attribute of the two attributes. Each attribute can be associated with its own set of settings. The two sets of settings 502 and 504 are for the two attributes, while the five sets of settings 506, 508, 510, 512, and 514 are for the five additional attributes.

The set of settings 520 indicates that the settings in the right panel 316 by default are represented as checkboxes for indicating a yes or no option. The set of settings 502 allows the selected of the report, which in this example corresponds to a balance sheet, to be presented in a chart format, where the key identifies the checkbox for this option, and the value indicates the status of the checkbox. The set of settings 504 allows the selected section of the report to be presented in a table format in addition to or instead of the chart format, where the key identifies the checkbox for this option, and the value indicates the status of the checkbox. The table format is set up to include at least two row groups, one for assets and one for the net worth. The set of settings 510 allows the table to include three row groups instead, expanding the asset row group into a row group for assets inside the estate and an additional row group for assets outside the estate. The asset row group (and each of the two expanded row groups) is customizable in terms of columns, and the sets of settings 506, 508, 512, and 514 correspond to columns that can be included in or excluded from the asset row group. As indicated above, the data for these columns can be originally stored in one or more of the data sources. The net worth row group indicates the total account value. In addition, the set of settings 512, for example, includes a setting where the name is postfixed by "Text" to indicate that this setting is represented as a text field (and associated with another field of the same name lacking the postfix and an "Edit" link to invoke the text field), where the key identifies the text field and the value indicates the value entered into the text field. The value can be stored in this configuration file or additionally or alternatively stored into one of the data sources. It is to be appreciated that a configuration file can include any number of sets of settings, and each setting can define any aspect of the report. Referring back to FIG. 3B, based on the checkboxes selected in the right panel 316, the corresponding live preview is shown in the middle panel 318, with two row groups and two columns.

In some embodiments, the customization panel is set up to communicate an event for each interaction with a GUI element in the customization panel, such as selecting a checkbox or entering a value into a text field. Information representing such an event can include an event type, an identifier of the GUI element or the corresponding element in a section of the report, and the current value of the setting. Information regarding the events affects the behavior of the display panel, as will be discussed in further detail.

In some embodiments, the customization panel (or another panel, as discussed above) can be included in the report view using multiple approaches. In one approach, the report library can handle the rendering based on a configuration file. Instead of being collected in a standalone file, the group of configurations for the customization panel can be merged into the configuration file for the navigation panel or an overall configuration file. For example, the content of the configuration file illustrated in FIG. 5 can be inserted into the set of properties 404, such as right before the line for the isExpanded property. Alternatively, the customization panel can be injected into the report view via content projection. For example, the portion 206 of the code snippet in FIG. 2 is used to allows injection of the right panel as a customization panel, where each "rt-content" subclass corresponds to a setting in the right panel.

3.4. View Adjustment Panel

In some embodiments, a view adjustment panel in the report view, such as the top panel 320 in FIG. 3B, enables view adjustment of the report at run time. The view adjustment panel includes GUI elements corresponding to actions to adjust the view of a section of the report, such as the section corresponding to the GUI element selected in the navigation panel. An interaction with a GUI element in the view adjustment panel can trigger a real-time preview of the section or any portion thereof in a display panel of the report view based on the corresponding action. The view adjustment panel can be browsed like an ordinary webpage.

In some embodiments, the behavior of the view adjustment panel is similarly controlled by a group of configurations, the GUI elements in the view adjustment panel can represent common view adjustment actions, such as fixed scaling at predetermined zoom levels, custom scaling at a user-specified zoom level, scaling based on a reference size (e.g., a window width or a page width), or scaling to the full screen (presentation mode). Each page of a report can have a default format, such as the A4 size in landscape mode. The view adjustment panel can take the available viewport width and height and implement the actions. As an example, an action can be implemented using the transform property in Cascading Style Sheet (CSS) applied to an HTML file. Zooming to 150% can be implemented with "Transform: scale (1.5); Transform-origin: top left;". As another example, an action can be implemented using the HTMLElement element and its requestFullscreen method.

In some embodiments, the view adjustment panel is set up to communicate an event for each interaction with a GUI element in the view adjustment panel or the full screen, such as hitting a presentation button to enter a full screen presentation and hitting the escape key to exit the full screen presentation. Information representing such an event can include an event type, an identifier of the GUI element, and the current status of the GUI element. Information regarding the events affects the behavior of the display panel, as further discussed below.

3.5 Display Panel and Report Document Generation

In some embodiments, a display panel in the report view, such as the middle panel 318 in FIG. 3B, enables previewing of the report at run time. The preview is presented or refreshed in real time upon delivery of information regarding events occurring in other panels in the report view. As discussed above, these events can include any interactions with GUI elements in the navigation panel, the customization panel, or the view adjustment panel. Information regarding such an event would identify the appropriate section of the report or an element thereof and include other relevant data to enable the identified portion of the report to be properly shown in the display panel. The display panel can also be browsed like an ordinary webpage.

In some embodiments, initially, the display panel can show no content or a default section of the report in a default format. When a GUI element in the navigation panel receives an input, the corresponding section of the report is shown live in the display panel. When a GUI element in the customization panel receives an input, the appearance of a corresponding element of the corresponding section of the report is adjusted and shown live in the display panel. When a GUI element in the view adjustment panel receives an input, the presentation of the corresponding section of the report is adjusted and shown live in the display panel.

In some embodiments, the report library allows the generation of a report document from the report view using existing methods, which preserve all features of the report view represented by an HTML file and all the configurations and thus ensures consistency between the report view and the report document. For example, HTML2PDF can be used to convert the report view using current values of the configurations into a PDF document. The report library can send a Universal Resource Locator (URL) pointing to the HTML file of the review as well as the report data and metadata based on the configurations obtained via the customization panel. The report library can also allow automatic cycling through all sections of the report and generating a report document that includes the full report.

4. Example Processes

Figure 6:
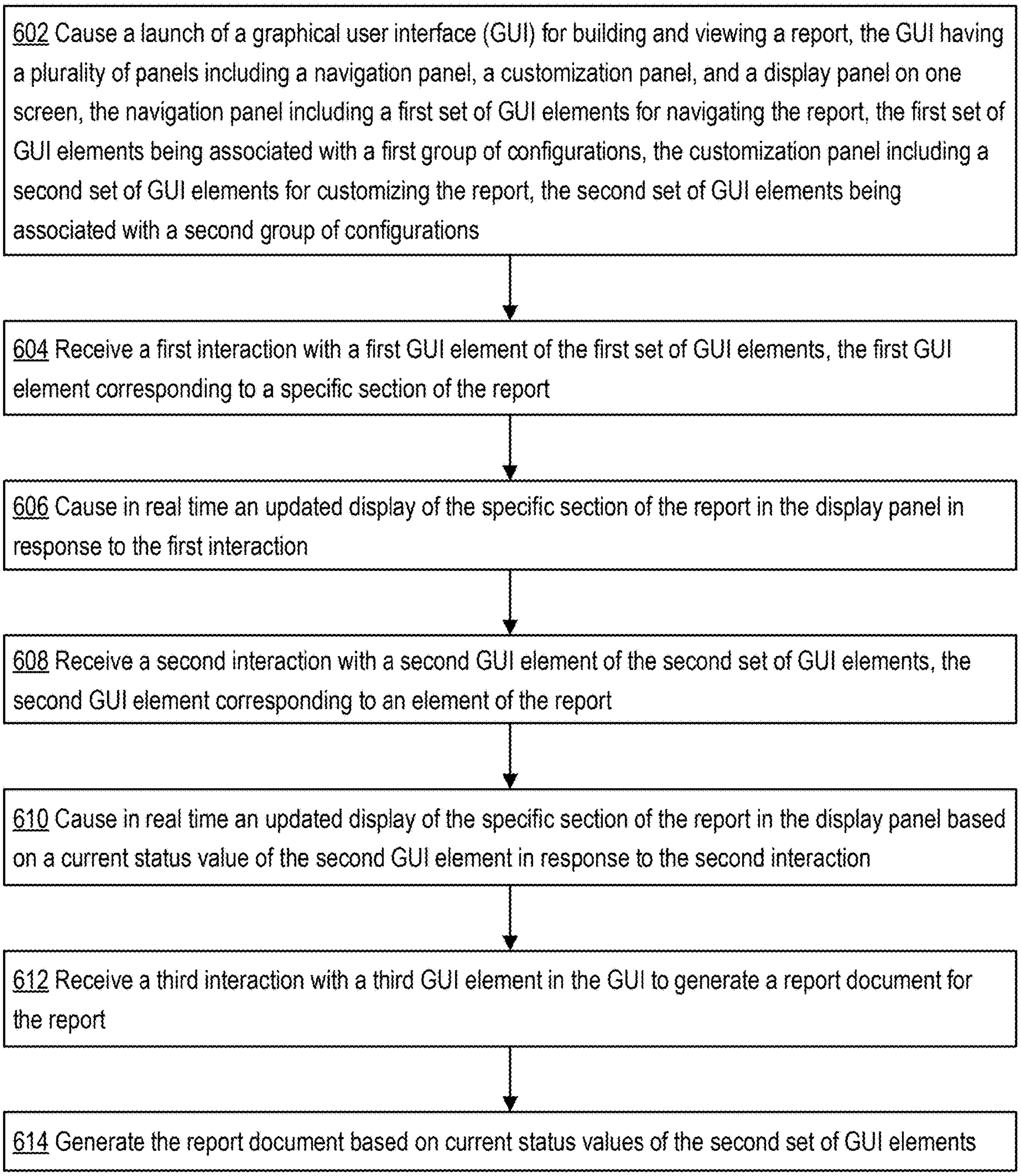
FIG. 6 illustrates a process of managing a report platform for customizing and presenting a report.

FIG. 6 illustrates a process of managing a report platform for customizing and presenting a report in accordance with disclosed embodiments. FIG. 6 is shown in simplified, schematic format for purposes of illustrating a clear example and other embodiments may include more, fewer, or different elements connected in various manners. FIG. 6 is intended to disclose an algorithm, plan, or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In step 602, a device is programmed to cause a launch of a graphical user interface (GUI) for building and viewing a report, the GUI having a plurality of panels including a navigation panel, a customization panel, and a display panel on one screen. The navigation panel includes a first set of GUI elements for navigating the report. The first set of GUI elements is associated with a first group of configurations. The customization panel includes a second set of GUI elements for customizing the report. The second set of GUI elements is associated with a second group of configurations.

In some embodiments, the navigation panel includes a graphical representation of a hierarchical organization of the report into sections. Interaction with a GUI element of the first set of GUI elements leads to a selection or a movement of a section of the report. In certain embodiments, a GUI element of the second set of GUI elements represents a setting of a particular element of the report. Interaction with the GUI element leads to a change of appearance of the particular element of the report.

In some embodiments, the first group of configurations control how the first set of GUI elements are presented in the navigation panel or how a corresponding set of sections of the report are organized in the report. In certain embodiments, the second group of configurations control how the second set of GUI elements are presented in the customization panel or how a corresponding section of the report is presented in the report.

In some embodiments, the GUI is presented based on an HTML file that defines a layout of the screen and allows setting up a panel on the screen via an input interface to accept configurations or pass event information. In certain embodiments, the GUI is represented based on an HTML file that allows setting up a panel on the screen using content projection. In other embodiments, the GUI is supported by a single-page application.

In step 604, the device is programmed to receive a first interaction with a first GUI element of the first set of GUI elements, the first GUI element corresponding to a specific section of the report.

In step 606, the device is programmed to cause in real time an updated display of the specific section of the report in the display panel in response to the first interaction. In some embodiments, the device is programmed to further cause in real time an updated rendering of the customization panel to represent a set of settings of elements in the specific section of the report in response to the first interaction.

In step 608, the device is programmed to receive a second interaction with a second GUI element of the second set of GUI elements, the second GUI element corresponding to an element of the report.

In step 610, the device is programmed to cause in real time an updated display of the specific section of the report in the display panel based on a current status value of the second GUI element in response to the second interaction.

In some embodiments, the plurality of panels includes a view adjustment panel that includes a third set of GUI elements for adjusting viewing of the report. In certain embodiments, the device is further configured to receive a specific interaction with a fourth GUI element of the third set of GUI elements. The device is further configured to then cause in real time an updated display of the specific section of the report in the display panel based on a current status value of the fourth GUI element in response to the specific interaction.

In step 612, the device is programmed to receive a third interaction with a third GUI element in the GUI to generate a report document for the report.

In step 614, the device is programmed to generate the report document based on current status values of the second set of GUI elements. In some embodiments, the report document includes a visual replica of content shown in the display panel.

5. Example Implementation

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
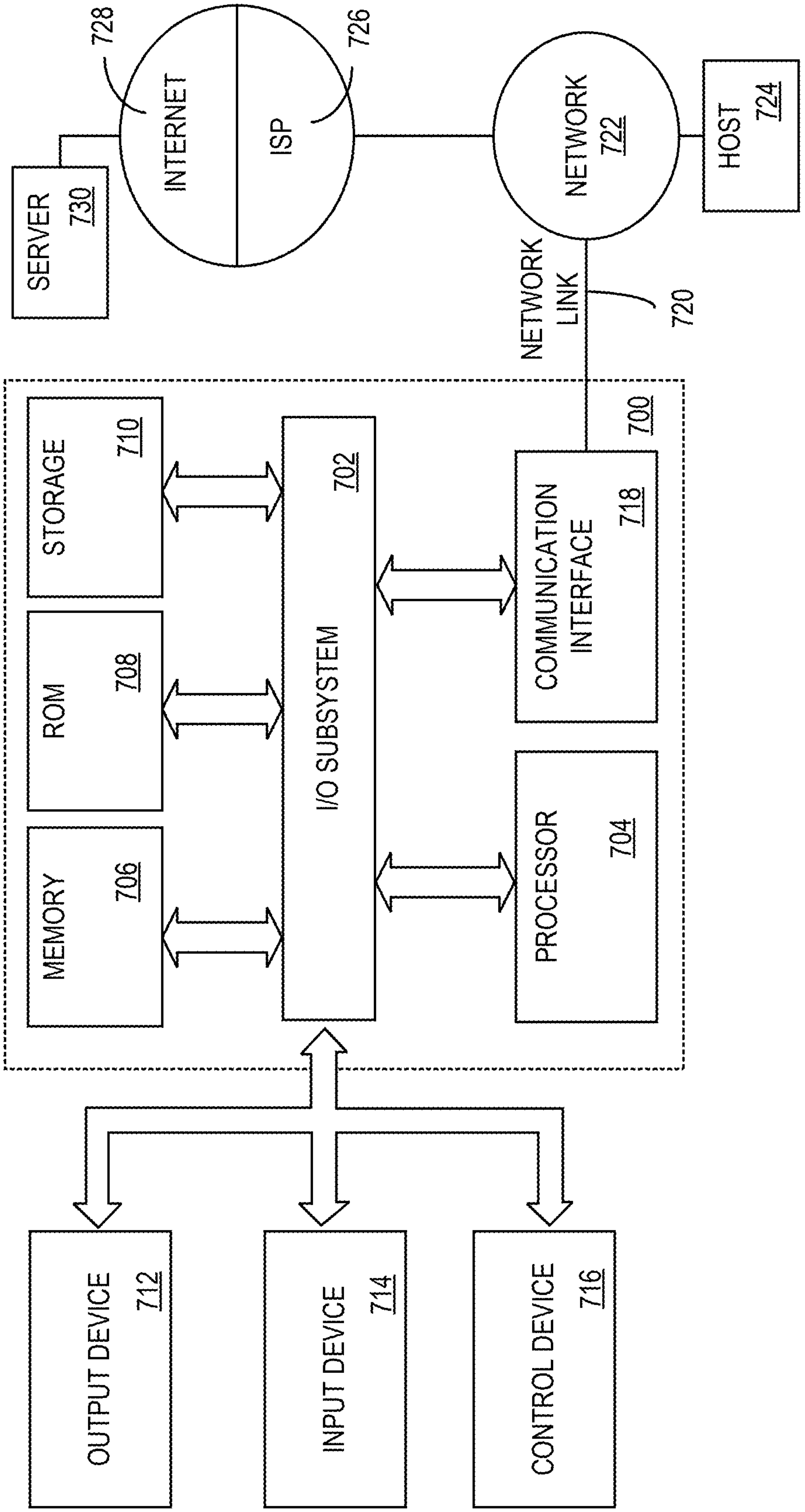
FIG. 7 illustrates an example computer system upon which various embodiments may be implemented.

FIG. 7 illustrates an example computer system upon which various embodiments may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or Advanced RISC Machines (ARM) processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as flash memory, or solid-state storage, magnetic disk, or optical disk such as CD-ROM or DVD-ROM, and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement Transmission Control Protocol/Internet Protocol (TCP/IP), Hypertext Transfer Protocol (HTTP) or other communication protocols; file processing instructions to interpret and render files coded using HTML, XML, Joint Photographic Experts Group (JPEG), Moving Picture Experts Group (MPEG) or Portable Network Graphics (PNG); user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 700 may be coupled via I/O subsystem 702 to at least one output device 712. In one embodiment, output device 712 is a digital computer display. Examples of a display that may be used in various embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators, or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on the output device 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In another embodiment, computer system 700 may comprise an internet of things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware, and interfaces for generating position reporting packets, notifications, pulse or heartbeat signals, or other recurring data transmissions that specify a position of the computer system 700, alone or in combination with other application-specific data, directed toward host computer 724 or server 730.

Computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to I/O subsystem 702. Communication interface 718 provides a two-way data communication coupling to network link(s) 720 that are directly or indirectly connected to at least one communication network, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a LAN, WAN, campus network, internetwork, or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic, or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server 730 may be coupled to internet 728. Server 730 broadly represents any computer, data center, virtual machine, or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, URL strings with parameters in HTTP payloads, application programming interface (API) calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a relational database system using SQL or NoSQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage 710, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

6. Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A system for managing a report platform for customizing and presenting a report, comprising:

a memory;

one or more processors coupled to the memory and configured to perform:

causing a launch of a graphical user interface (GUI) for building and viewing a report having a plurality of sections, the GUI having a plurality of panels including a navigation panel, a customization panel, and a display panel on one screen, the navigation panel including a first set of GUI elements for navigating the report, the first set of GUI elements being associated with a first group of configurations, receiving a first interaction with a first GUI element of the first set of GUI elements, the first GUI element corresponding to a specific section of the report;

causing, in response to the first interaction, in real time an introduction of the specific section of the report and no other section of the report into the display panel in response to the first interaction;

causing in real time an updated rendering of the customization panel in response to the first interaction, the customization panel including a second set of GUI elements for customizing the report, the second set of GUI elements being associated with a second group of configurations;

receiving a second interaction with a second GUI element of the second set of GUI elements, the second GUI element corresponding to an element of the report;

causing in real time an updated display of the specific section of the report in the display panel based on a current status value of the second GUI element in response to the second interaction;

receiving a third interaction with a third GUI element in the GUI to generate a report document for the report;

generating the report document based on current status values of the second set of GUI elements.

2. The system of claim 1, the navigation panel including a graphical representation of a hierarchical organization of the report into sections, interaction with a GUI element of the first set of GUI elements leading to a selection or a movement of a section of the report.

3. The system of claim 1, a GUI element of the second set of GUI elements representing a setting of a particular element of the report, interaction with the GUI element leading to a change of appearance of the particular element of the report.

4. The system of claim 1, the first group of configurations controlling how the first set of GUI elements are presented in the navigation panel or how a corresponding set of sections of the report are organized in the report.

5. The system of claim 1, the second group of configurations controlling how the second set of GUI elements are presented in the customization panel or how a corresponding section of the report is presented in the report.

6. The system of claim 1, the GUI being presented based on an HTML file that defines a layout of the screen and allows setting up a panel on the screen via an input interface to accept configurations or pass event information.

7. The system of claim 1, the GUI being represented based on an HTML file that allows setting up a panel on the screen using content projection.

8. The system of claim 1, the plurality of panels including a view adjustment panel, the view adjustment panel including a third set of GUI elements for adjusting viewing of the report.

9. The system of claim 8, the one or more processors further configured to perform:

receiving a specific interaction with a fourth GUI element of the third set of GUI elements;

causing in real time an updated display of the specific section of the report in the display panel based on a current status value of the fourth GUI element in response to the specific interaction.

10. The system of claim 1, the report document including a visual replica of content shown in the display panel.

11. The system of claim 1, the GUI being supported by a single-page application.

12. A non-transitory, computer-readable storage medium storing one or more sequences of instructions which when executed cause one or more processor to perform:

causing a launch of a graphical user interface (GUI) for building and viewing a report having a plurality of sections, the GUI having a plurality of panels including a navigation panel, a customization panel, and a display panel on one screen, the navigation panel including a first set of GUI elements for navigating the report, the first set of GUI elements being associated with a first group of configurations, receiving a first interaction with a first GUI element of the first set of GUI elements, the first GUI element corresponding to a specific section of the report;

causing, in response to the first interaction, in real time an introduction of the specific section of the report and no other section of the report into the display panel in response to the first interaction;

causing in real time an updated rendering of the customization panel in response to the first interaction, the customization panel including a second set of GUI elements for customizing the report, the second set of GUI elements being associated with a second group of configurations;

receiving a second interaction with a second GUI element of the second set of GUI elements, the second GUI element corresponding to an element of the report;

causing in real time an updated display of the specific section of the report in the display panel based on a current status value of the second GUI element in response to the second interaction;

receiving a third interaction with a third GUI element in the GUI to generate a report document for the report;

generating the report document based on current status values of the second set of GUI elements.

13. The non-transitory, computer-readable storage medium of claim 12, the navigation panel including a graphical representation of a hierarchical organization of the report into sections, interaction with a GUI element of the first set of GUI elements leading to a selection or a movement of a section of the report.

14. The non-transitory, computer-readable storage medium of claim 12, a GUI element of the second set of GUI elements representing a setting of a particular element of the report, interaction with the GUI element leading to a change of appearance of the particular element of the report.

15. The non-transitory, computer-readable storage medium of claim 12, the first group of configurations controlling how the first set of GUI elements are presented in the navigation panel or how a corresponding set of sections of the report are organized in the report.

16. The non-transitory, computer-readable storage medium of claim 12, the second group of configurations controlling how the second set of GUI elements are presented in the customization panel or how a corresponding section of the report is presented in the report.

17. The non-transitory, computer-readable storage medium of claim 12, the report document including a visual replica of content shown in the display panel.

18. The non-transitory, computer-readable storage medium of claim 12, the GUI being supported by a single-page application.

19. A method of managing a report platform for customizing and presenting a report, comprising:

causing a launch of a graphical user interface (GUI) for building and viewing a report having a plurality of sections, the GUI having a plurality of panels including a navigation panel, a customization panel, and a display panel on one screen, the navigation panel including a first set of GUI elements for navigating the report, the first set of GUI elements being associated with a first group of configurations, receiving a first interaction with a first GUI element of the first set of GUI elements, the first GUI element corresponding to a specific section of the report;

causing, in response to the first interaction, in real time an introduction of the specific section of the report and no other section of the report into the display panel in response to the first interaction;

causing in real time an updated rendering of the customization panel in response to the first interaction, the customization panel including a second set of GUI elements for customizing the report, the second set of GUL elements being associated with a second group of configurations;

receiving a second interaction with a second GUI element of the second set of GUI elements, the second GUI element corresponding to an element of the report;

causing in real time an updated display of the specific section of the report in the display panel based on a current status value of the second GUI element in response to the second interaction;

receiving a third interaction with a third GUI element in the GUI to generate a report document for the report;

generating the report document based on current status values of the second set of GUI elements, where the method is performed by one or more processors.

* * * * *